United States Patent
Kim et al.

(10) Patent No.: US 11,061,580 B2
(45) Date of Patent: Jul. 13, 2021

(54) STORAGE DEVICE AND CONTROLLERS INCLUDED IN STORAGE DEVICE

(71) Applicant: SAMSUNG ELECTRONICS CO., LTD., Suwon-si (KR)

(72) Inventors: Jae Woong Kim, Suwon-si (KR); Nam Wook Kang, Hwaseong-si (KR); Da Woon Jung, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/945,385

(22) Filed: Apr. 4, 2018

(65) Prior Publication Data
US 2019/0073139 A1    Mar. 7, 2019

(30) Foreign Application Priority Data
Sep. 7, 2017   (KR) .......................... 10-2017-0114772

(51) Int. Cl.
*G06F 3/06* (2006.01)

(52) U.S. Cl.
CPC .......... *G06F 3/0613* (2013.01); *G06F 3/0625* (2013.01); *G06F 3/0658* (2013.01); *G06F 3/0659* (2013.01); *G06F 3/0688* (2013.01)

(58) Field of Classification Search
CPC .... G06F 3/0613; G06F 3/0688; G06F 3/0659; G06F 3/0658; G06F 3/0625
See application file for complete search history.

(56) References Cited

U.S. PATENT DOCUMENTS

| | | | |
|---|---|---|---|
| 7,543,108 B2 | 6/2009 | Kakihara et al. | |
| 7,724,602 B2 | 5/2010 | Hur et al. | |
| 8,145,828 B2 | 3/2012 | Ouchi | |
| 8,332,673 B2 | 12/2012 | Taguchi et al. | |
| 8,467,262 B2 | 6/2013 | Choi et al. | |
| 9,760,311 B1* | 9/2017 | Amir | G06F 1/3206 |
| 2009/0172258 A1* | 7/2009 | Olbrich | G06F 13/1657 |
| | | | 711/103 |
| 2011/0060927 A1* | 3/2011 | Fillingim | G11C 5/141 |
| | | | 713/320 |

(Continued)

FOREIGN PATENT DOCUMENTS

| | | |
|---|---|---|
| JP | 2003157200 A | 5/2003 |
| JP | 2016212580 A | 12/2016 |
| KR | 1564574 A | 5/2015 |

*Primary Examiner* — Kalpit Parikh
(74) *Attorney, Agent, or Firm* — Volentine, Whitt & Francos, PLLC

(57) ABSTRACT

A storage device includes a plurality of flash memories, a first local controller connected to a first group of flash memories among the plurality of flash memories, a second local controller connected to a second group of flash memories among the plurality of flash memories, and a global controller. The global controller transmits commands to the first local controller and the second local controller. The first local controller includes a first processor that transmits first information on a type and number of commands associated with an operation performed on the first group of flash memories to the global controller. The second local controller includes a second processor that transmits second information on a type and number of commands associated with an operation performed on the second group of flash memories to the global controller.

20 Claims, 15 Drawing Sheets

(56) References Cited

U.S. PATENT DOCUMENTS

| | | |
|---|---|---|
| 2013/0305008 A1 | 11/2013 | Kwon et al. |
| 2014/0325122 A1 | 10/2014 | Kim et al. |
| 2015/0032915 A1 | 1/2015 | Hur et al. |
| 2016/0224246 A1* | 8/2016 | Shah ..................... G06F 3/0659 |
| 2016/0306592 A1 | 10/2016 | Oh et al. |
| 2016/0342328 A1* | 11/2016 | Rangarajan ............. G06F 3/061 |

* cited by examiner

STORAGE DEVICE AND CONTROLLERS INCLUDED IN STORAGE DEVICE

This application claims priority from Korean Patent Application No. 10-2017-0114772 filed on Sep. 7, 2017 in the Korean Intellectual Property Office, the disclosure of which is incorporated herein by reference in its entirety.

BACKGROUND

1. Technical Field

The present disclosure relates to a storage device, and more particularly to a storage device with optimized performance and QoS (Quality of Service).

2. Description of the Related Art

Storage devices have been developed to increase performance, capacity and reliability. In order to increase the performance along with capacity of a storage device, a large amount of flash memories (e.g., a NAND flash memory) are required by the storage device. Recently, as storage devices have ultra high capacity, the number of memories included in the storage devices is ever increasing.

Different storage devices may have different amounts of power consumption required by customers. Therefore, recently, there is required a technique for optimally managing the performance and QoS (Quality of Service) of a storage device within the amount of power consumption required by customers.

When operations such as sequential read/write are performed, a large number of memories may be operated simultaneously, and thus a storage device may consume a large amount of power. The storage device has to perform an operation of lowering the performance of the storage device (for example, delaying the operation) before the power consumption exceeds the power specification of the storage device, that is, the power consumption required by the customers. In this regard, if all of the memories included in the storage device are managed to consume the same power, there is a problem that the performance (e.g., processing speed) of the storage device may be lowered.

SUMMARY OF THE DISCLOSURE

Aspects of the present disclosure provide a storage device with optimized performance and QoS (Quality of Service).

Objects of the present disclosure are not limited to the above-mentioned objects. Other objects that are not mentioned may be apparent to those skilled in the art from the following description.

According to some embodiments, the storage device comprises a plurality of flash memories, a first local controller connected to a first group of flash memories among the plurality of flash memories, a second local controller connected to a second group of flash memories among the plurality of flash memories, and a global controller. The second group of flash memories are different from the first group of flash memories. The global controller transmits commands to at least one of the first local controller and the second local controller. The first local controller comprises a first processor that transmits first information on a type and number of commands associated with an operation performed on the first group of the flash memories to the global controller, and the second local controller comprises a second processor that transmits second information on a type and number of commands associated with an operation performed on the second group of the flash memories to the global controller.

According to some embodiments, a local controller is disposed in a storage device and connected to a global controller. The local controller comprises a command receiver that receives one or more commands from the global controller, a processor that performs an operation corresponding to the received one or more commands on a plurality of flash memories connected to the local controller, and an adaptive power management (APM) that receives information on a number and type of commands associated with the operation performed on the plurality of flash memories from the processor. The APM calculates a power consumption based on the received information. The processor transmits information on the number and type of commands associated with the operation performed on the plurality of flash memories to the global controller.

According to some embodiments, a global controller is disposed in a storage device and connected to a first local controller and a second local controller, which are physically separated from each other. The global controller comprises a queue area where one or more commands associated with a next cycle are queued during a current cycle, a power controller having a predetermined number of power tokens that it distributes to each of the first local controller and the second local controller, and a command analyzer that checks first information on the one or more commands queued in the queue area during the current cycle. The power controller receives, from the first local controller, second information on a type and number of commands associated with an operation performed on a first group of flash memories connected to the first local controller during the current cycle. The power controller receives, from the second local controller, third information on a type and number of commands associated with an operation performed on a second group of flash memories connected to the second local controller during the current cycle. The second group of flash memories are different from the first group of flash memories. The third information is different from the first information and from the second information.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Hereinafter, exemplary embodiments of the present disclosure will be described in detail with reference to the accompanying drawings.

Figure 1:
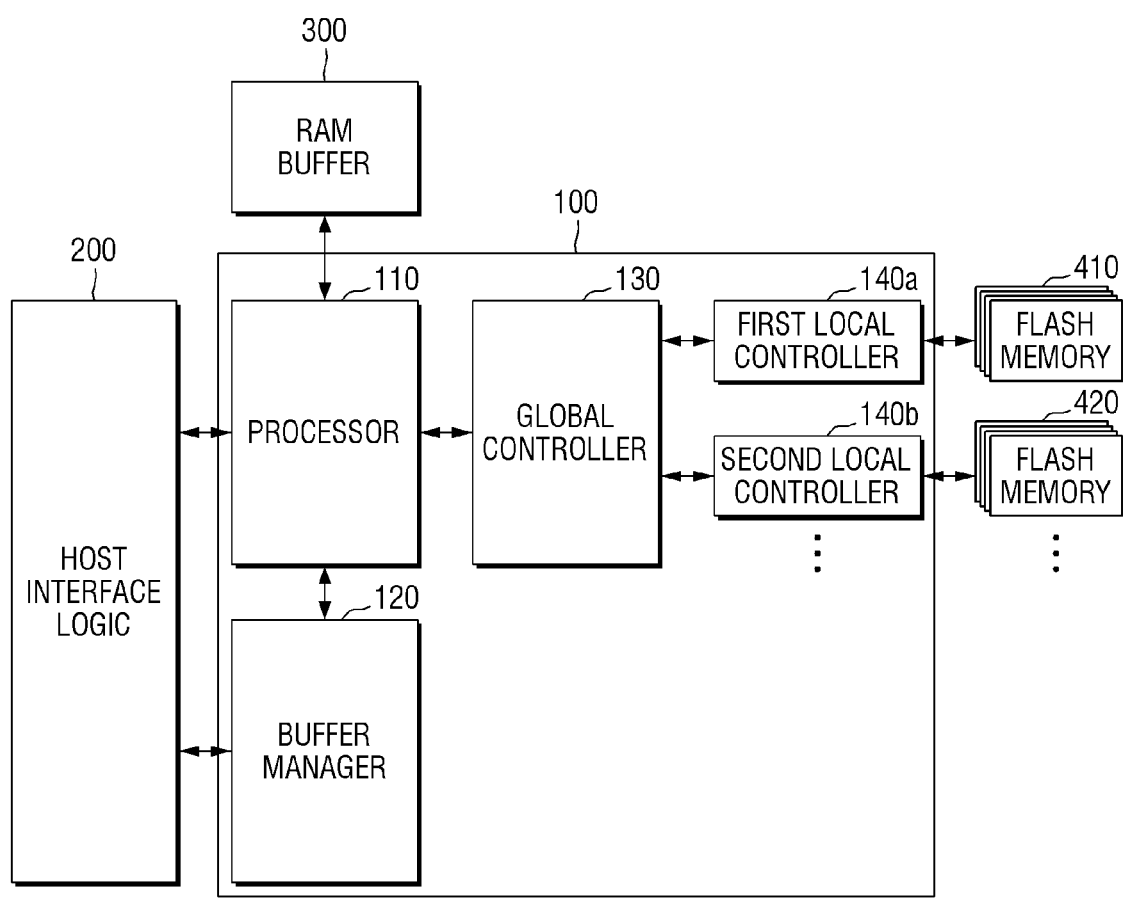
FIG. 1 is a block diagram for illustrating a storage device according to some exemplary embodiments of the present disclosure.
Figure 2:
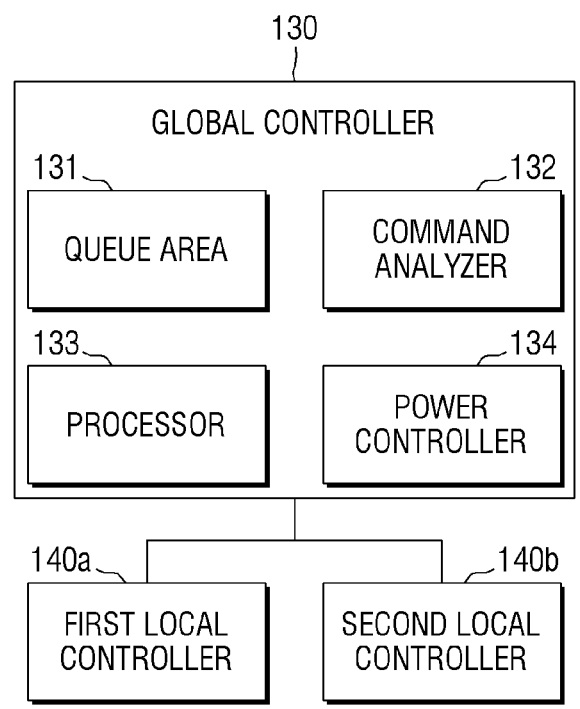
FIG. 2 is a block diagram for illustrating a global controller included in a storage device according to some exemplary embodiments of the present disclosure.
Figure 3:
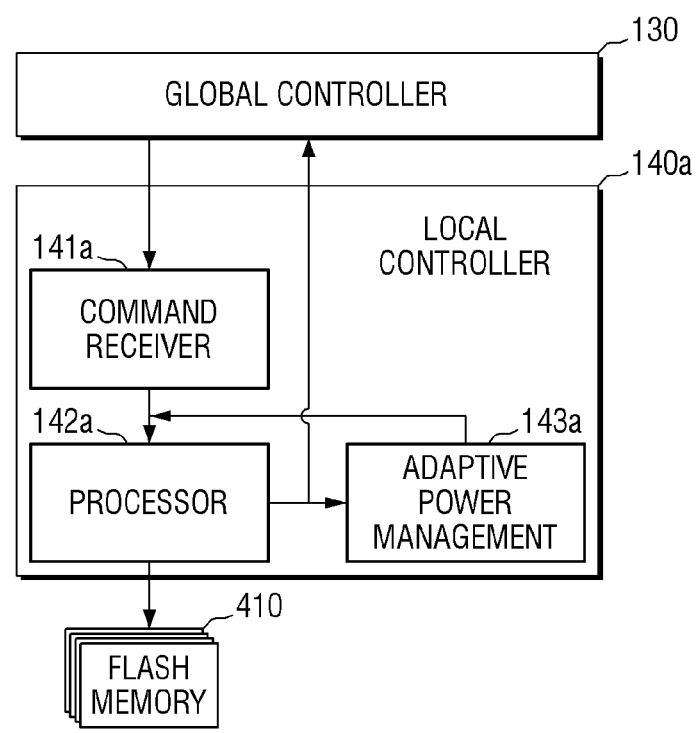
FIG. 3 is a block diagram for illustrating a local controller included in a storage device according to some exemplary embodiments of the present disclosure.

FIG. 1 is a block diagram for illustrating a storage device according to some exemplary embodiments of the present disclosure. FIG. 2 is a block diagram for illustrating a global controller included in a storage device according to some exemplary embodiments of the present disclosure. FIG. 3 is a block diagram for illustrating a local controller included in a storage device according to some exemplary embodiments of the present disclosure.

The storage device 1 according to some exemplary embodiments of the present disclosure may be, but is not limited to, a solid-state drive (SSD) device.

Referring to FIG. 1, the storage device 1 according to some exemplary embodiments of the present disclosure includes an SSD controller 100, a host interface logic 200, a random access memory (RAM) buffer 300, and a plurality of flash memories 410 and 420. The elements shown in FIG. 1 are not essential for implementing the storage device 1. In some implementations, the storage device 1 may include more or fewer elements than those listed above.

An SSD controller 100 may include a processor 110, a buffer manager 120, a global controller 130, and a plurality of local controllers (e.g., a first local controller 140a and a second local controller 140b).

The processor 110 may receive commands from a host via the host interface logic 200. The processor 110 may process the received commands and may control the buffer manager 120, the global controller 130, the local controllers 140a and 140b, and the like.

The host interface logic 200 may be disposed between the host and the SSD controller 100 to deliver commands from the host to the SSD controller 100 or to deliver responses from the SSD controller 100 to the host. In some exemplary embodiment of the present disclosure, the host interface logic 200 may be implemented in accordance with a serial ATA (SATA) interface, a PCI Express interface, a serial attached SCSI (SAS) interface, etc., for example.

The RAM buffer 300 may include a volatile memory mounted outside the SSD controller 100 including DRAM (dynamic RAM). The RAM buffer 300 may be used as a cache or may be used to store mapping information on data stored in a flash memory 400.

Each of the plurality of flash memories 410 and 420 may include one or more flash memory chips. For example, the flash memory chip may be a NAND flash memory chip.

The global controller 130 may be connected to the processor 110 and the plurality of local controllers 140a and 140b.

The processor 110 may transmit commands received from the host interface logic 200 to the global controller 130. The commands transmitted to the global controller 130 may include a read command, a write command, an erase command, and the like.

According to some exemplary embodiments of the present disclosure, the host interface logic 200 may send a plurality of commands directly to the global controller 130.

The global controller 130 may transmit the commands received via the processor 110 to each of the plurality of local controllers 140a and 140b. The global controller 130 may determine the power consumption in each of the plurality of local controllers 140a and 140b. When the global controller 130 receives one or more commands associated with a second cycle via the processor 110, it may queue the commands therein. A detailed description thereof will be made below with reference to FIG. 2.

Referring to FIG. 2, the global controller 130 may include a queue area 131, a command analyzer 132, a processor 133, and a power controller 134. The elements shown in FIG. 2 are not essential for implementing the global controller 130. In some implementations, the global controller 130 may include more or fewer elements than those listed above.

The queue area 131 may be where one or more commands associated with a second cycle, which is the next cycle to the first cycle are queued during the first cycle (e.g., the current cycle). For example, if the global controller 130 receives one or more commands associated with the second cycle during the first cycle, it may store the command in the queue area 131 during the first cycle.

The command analyzer 132 may check information on one or more commands waiting in the queue area 131 during the first cycle.

The information checked by the command analyzer 132 may include information on the number of commands queued in the queue area 131 during the first cycle, information on the type of the commands queued in the queue area 131 during the first cycle, and information on the local controllers to process each of the commands during the second cycle.

The processor 133 may be responsible for the overall operation performed on the global controller 130 and may control the queue area 131, the command analyzer 132 and the power controller 134.

The processor 133 may transmit the commands queued in the queue area 131 during the first cycle to each of the plurality of local controllers 140a and 140b during the second cycle. The command to be transmitted to the first local controller 140a may be one to be processed at the first local controller 140a during the second cycle, and the command to be transmitted to the second local controller 140b may be one to be processed at the second local controller 140b during the second cycle.

The power controller 134 may receive first information on the type and number of commands associated with the operations performed on the plurality of flash memories connected to the first local controller 140a during the first cycle from the first local controller 140a, and second information on the type and number of commands associated with the operations performed on the plurality of flash memories connected to the second local controller 140b during the first cycle from the second local controller 140b.

The command analyzer 132 may recognize third information on the type and number of commands queued in the queue area 131 during the first cycle. The third information may be different from the first information and from the second information.

The power controller 134 may determine the power to be consumed in the first local controller 140a during the second cycle and the power to be consumed in the second local controller 140b during the second cycle based on the first information, the second information and the third information described above.

According to some exemplary embodiments of the present disclosure, the power controller 134 may have a predetermined number of power tokens and may use these power tokens to determine the power to be consumed in each of the plurality of local controllers 140a and 140b during the second cycle.

For example, the power controller 134 may distribute power tokens across the plurality of local controllers 140a and 140b based on the first information, the second information and the third information described above. The power tokens described above may be virtual resources representing the power to be consumed in each of the plurality of local controllers 140a and 140b during the second cycle.

When the power controller 134 has distributed different numbers of power tokens to the first local controller 140a and the second local controller 140b during the first cycle, the power consumed by the first local controller 140a and the second local controller 140b during the second cycle may vary depending on the numbers of distributed power tokens. For example, the power controller 134 may distribute the power tokens so that one of the local controllers, which has more operations to process during the second cycle, can consume more power.

The power controller 134 may include a mapping table indicating the power to be consumed during the second cycle using the above-described third information. For example, the power controller 134 may store therein a mapping table indicating power consumption according to a read command, power consumption according to a write command, and power consumption according to an erase command. It is to be understood that this is merely illustrative and the mapping table may indicate power consumption depending on the types and numbers of commands.

According to some exemplary embodiments of the present disclosure, the power controller 134 may use the above-described mapping table when it distributes power tokens across the plurality of local controllers 140a and 140b based on the first info, the second information and the third information.

Referring again to FIG. 1, the plurality of flash memories 410 and 420 may be connected to the plurality of local controllers 140a and 140b, respectively. For example, a first group of flash memories 410 among the plurality of flash memories 410, 420 may be connected to the first local controller 140a. A second group of flash memories 420 among the plurality of flash memories 410, 420 may be connected to the second local controller 140b. The second group of flash memories 420 may include flash memories different from the first group of flash memories 410 among the memories included in the plurality of flash memories.

Referring to FIG. 3, the first local controller 140a may include a command receiver 141a, a processor 142a, and an adaptive power management (APM) 143a. The elements shown in FIG. 3 are not essential for implementing the first local controller 140a. In some implementations, the first local controller 140a may include more or fewer elements than those listed above. It is to be noted that although only the first local controller 140a is described for convenience of illustration, all the local controllers included in the storage device 1 according to some exemplary embodiments of the present disclosure may have the same elements as the first local controller 140a.

The command receiver 141a may receive one or more commands from the global controller 130 during the first cycle. The command receiver 141a may receive power tokens from the global controller 130.

The processor 142a may receive one or more commands from the command receiver 141a during the first cycle. The processor 142a may perform an operation corresponding to the one or more commands received during the first cycle on the first group of flash memories 410 connected to the first local controller 140a.

According to some exemplary embodiments of the present disclosure, the operations performed by the processor 142a on the first group of flash memories 410 may include operations performed based on the commands received via the host, and operations for processing internal IO such as garbage collection or wear leveling.

The processor 142a may periodically or aperiodically transmit information on commands associated with operations performed on the first group of flash memories 410 to the APM 143a and the global controller 130. For example, the information on the commands associated with the operation performed on the first group of flash memories 410 may include information on the type and number of commands received via the host and information on the type and number of commands for processing the internal IO. The commands received via the host and the commands for processing the internal IO may include a read command, a write command, and an erase command.

The APM 143a may receive information on the type and number of commands associated with the operations performed on the first group of flash memories 410 during the first cycle via the processor 142a, and may calculate the power to be consumed by operations performed on the first group of flash memories 410 during the first cycle based on the received information.

The power consumption may be calculated by Equation 1 below:

$$P = Ip + (Rcount*Rpower + Ecount*Epower + Wcount*Wpower) \quad \text{[Equation 1]}$$

where P may denote be a value of power consumed in association with an operation performed on the first group of flash memories 410 connected to the first local controller 140a during the current cycle, Ip may denote a value of idle power consumed by the local controller 140a during the current cycle irrespectively of the commands received by the local controller 140a, Rcount may denote the number of read commands, Ecount may denote the number of erase commands, Wcount may denote the number of write commands, Rpower may denote a value of power to be consumed when the first local controller 140a performs an operation on the first group of flash memories 410 during the current cycle for a single read command, Epower may denote a value of power to be consumed when the first local controller 140a performs an operation on the first group of flash memories 410 during the current cycle for a single erase command, and Wpower may denote a value of power to be consumed when the first local controller 140a performs an operation on the first group of flash memories 410 during the current cycle for a single write command. The values of Ip, Rpower, Epower and Wpower may be stored in the APM 143a in advance.

According to some exemplary embodiments of the present disclosure, the APM 143a may store in advance a mapping table for extracting power consumption based on information on the number and type of commands received via the processor 133. The APM 143a may calculate the power consumption during the first cycle using the above-described mapping table.

According to some exemplary embodiments of the present disclosure, the APM 143a may check the number of power tokens received at the global controller 130. By checking the number of such power tokens, the APM 143a may check the power available to the first local controller 140a during the first cycle. The APM 143a may adjust the command processing speed by the first local controller 140a based on the checked power and the power to be consumed during the current cycle calculated by Equation 1.

For example, when the APM 143a recognizes that the power corresponding to the number of the received power tokens is 12 W, it may decrease the command processing speed if the power to be consumed during the current cycle calculated by Equation 1 exceeds 12 W, whereas it may increase the command processing speed if the power to be consumed during the current cycle calculated by Equation 1 is less than 12 W.

As described above, the APM 143a predicts the power consumption in real-time, increases the command processing speed if the predicted power is smaller than the power allocated to the first local controller 140a, and decreases the command processing speed if the predicted power is greater than the power allocated to the first local controller 140a, such that the local controller itself can automatically adjust its performance.

Figure 4:
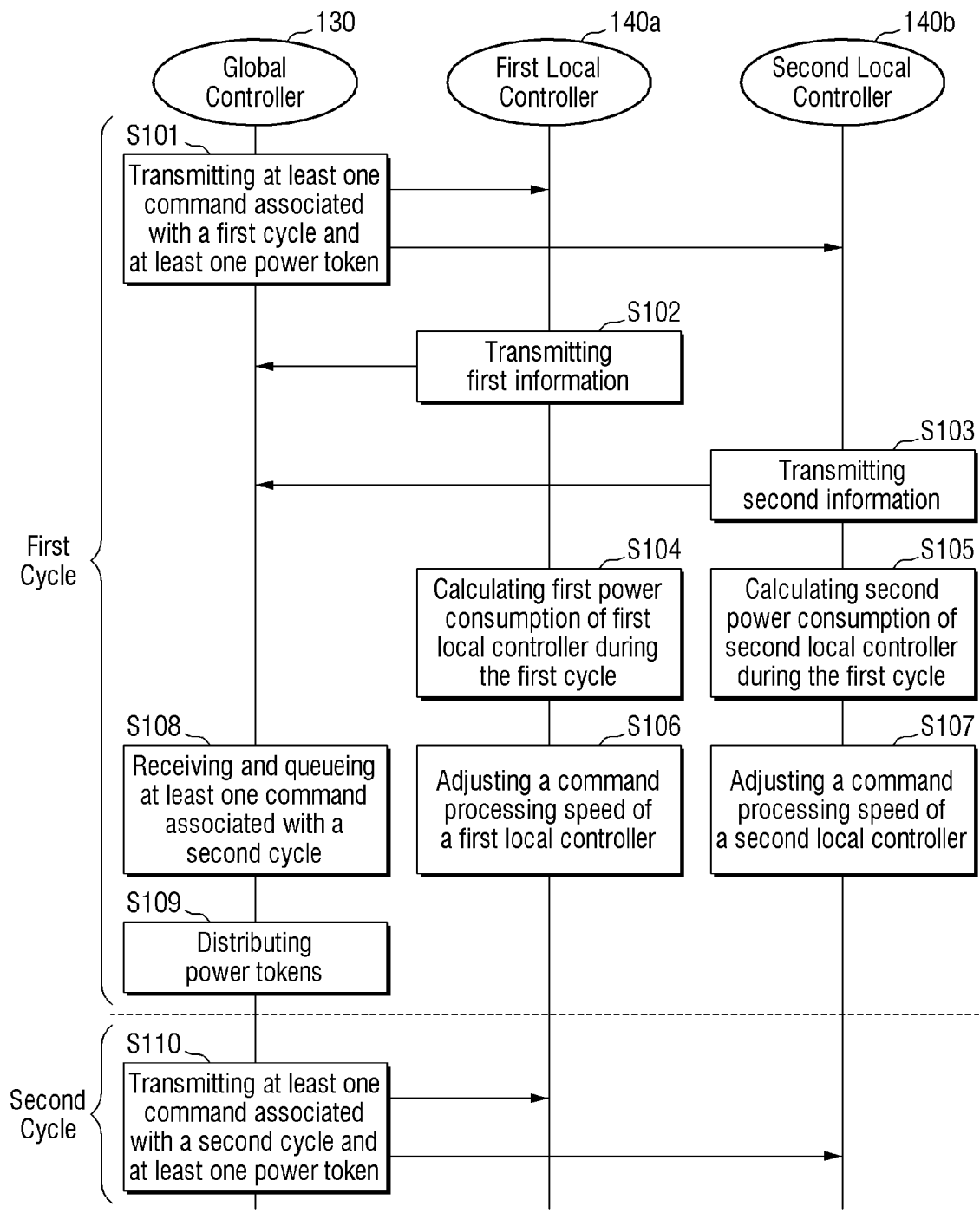
FIG. 4 is a flowchart for illustrating an example of a method of determining power consumed in each of a plurality of local controllers and adjusting a command processing speed of each of the plurality of local controllers in a storage device according to some exemplary embodiments of the present disclosure.

FIG. 4 is a flowchart for illustrating an example of a method of determining power consumed in each of a plurality of local controllers and adjusting a command processing speed of each of the plurality of local controllers in a storage device according to some exemplary embodiments of the present disclosure. FIGS. 5A, 5B and 6 to 8 are diagrams for illustrating an example of a method of determining power consumed in each of the plurality of local controllers in a storage device according to some exemplary embodiments of the present disclosure.

The global controller 130 may queue one or more commands in the queue area 131 included therein before the first cycle, which will be described with reference to FIGS. 5A and 5B prior to describing step S101 of FIG. 4.

Figure 5A:
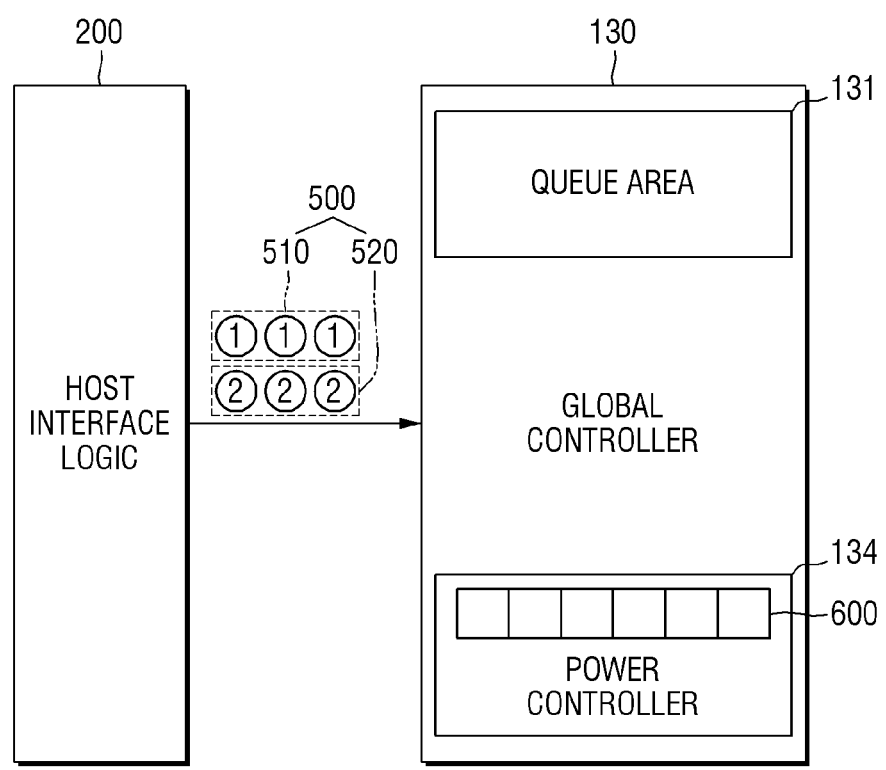
FIGS. 5A, 5B and 6 to 8 are diagrams for illustrating an example of a method of determining power consumed in each of the plurality of local controllers in a storage device according to some exemplary embodiments of the present disclosure.

Referring to FIG. 5A, the host interface logic 200 may send a plurality of commands 500 associated with the first cycle to the global controller 130 before the first cycle. Here, the plurality of commands 500 may include commands 510 associated with the operation to be performed at the first local controller 140a during the first cycle, and commands 520 associated with the operation to be performed at the second local controller 140b during the first cycle.

The power controller 134 included in the global controller 130 may have a predetermined number of power tokens 600. For example, the power controller 134 may have six power tokens 600. It is to be understood that the number of power tokens 600 is merely an example for convenience of illustration and is not limited to six.

Figure 5B:
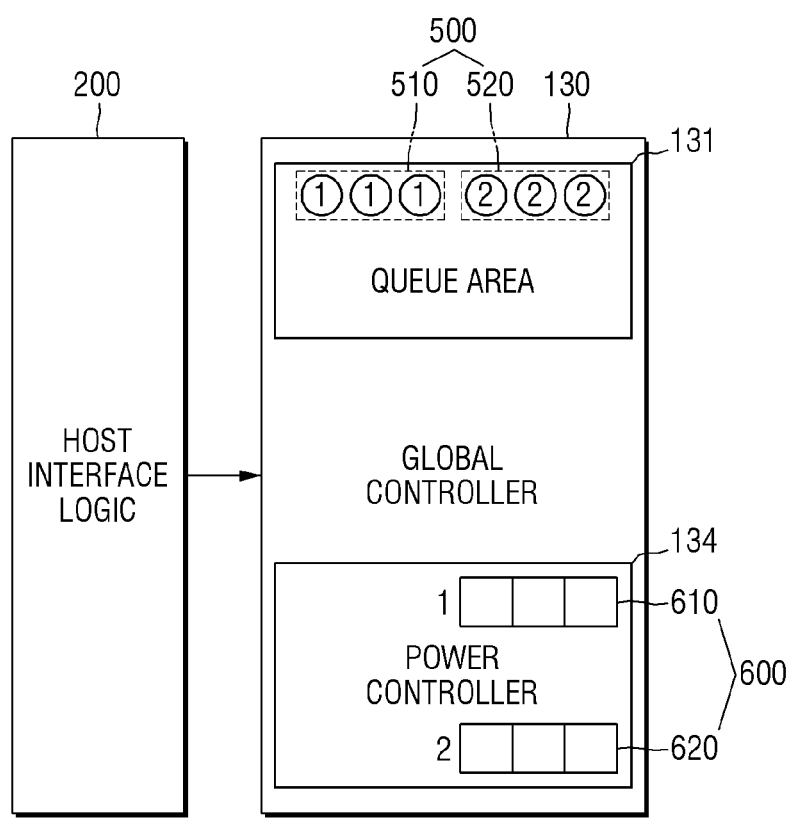

Referring to FIG. 5B, the queue area 131 included in the global controller 130 may queue the plurality of commands 500 received from the host interface logic 200.

The power controller 134 included in the global controller 130 may check information on the plurality of commands 500 queued in the queue area 131. The information on the plurality of commands 500 may include information on the number of the plurality of commands 500 queued in the queue area 131, information on the types of the plurality of commands 500 queued in the queue area 131, and information on the local controller to process each of the plurality of commands queued in the queue area 131 during the first cycle.

For example, the power controller 134 may recognize that there are three read commands in the queue area 131, which are to be processed at the first local controller 140a during the first cycle. In addition, the power controller 134 may recognize that there are three read commands in the queue area 131, which are to be processed at the second local controller 140b during the first cycle.

The power controller 134 may predict the power consumption in Watts when the three read commands are processed at the first local controller 140a during the first cycle. The power controller 134 may predict the power consumption in Watts when the three read commands are processed at the second local controller 140b during the first cycle.

If the power controller 134 recognizes that the power consumed by the first local controller 140a is equal to that of the second local controller 140b during the first cycle based on the predicted information, it may distribute the same number of power tokens 600 to the first local controller 140a and to the second local controller 140b. For example, if the power controller 134 predicts that the power consumed by the first local controller 140a is equal to that of the second local controller 140b during the first cycle as in the example of FIG. 5B, it may distribute three power tokens 610 to the first local controller 140a and three power tokens 620 to the second local controller 140b.

According to some other exemplary embodiments of the present disclosure, if the power controller 134 predicts that the power consumed by the first local controller 140a is different from that of the second local controller 140b during the first cycle based on the predicted information, it may distribute the power tokens 600 such that the number of power tokens distributed to the first local controller 140a is different from that of the second local controller 140b. For example, if the power controller 134 predicts that the power consumed by the first local controller 140a is larger than that of the second local controller 140b during the first cycle based on the predicted information, it may distribute more power tokens 600 to the first local controller 140a than to the second local controller 140b.

Referring to FIG. 4, the global controller 130 included in the storage device 1 may transmit one or more commands 500 and at least one power token 600 associated with the first cycle during the first cycle to the first local controller 140a and to the second local controller 140b (step S101).

Figure 6:
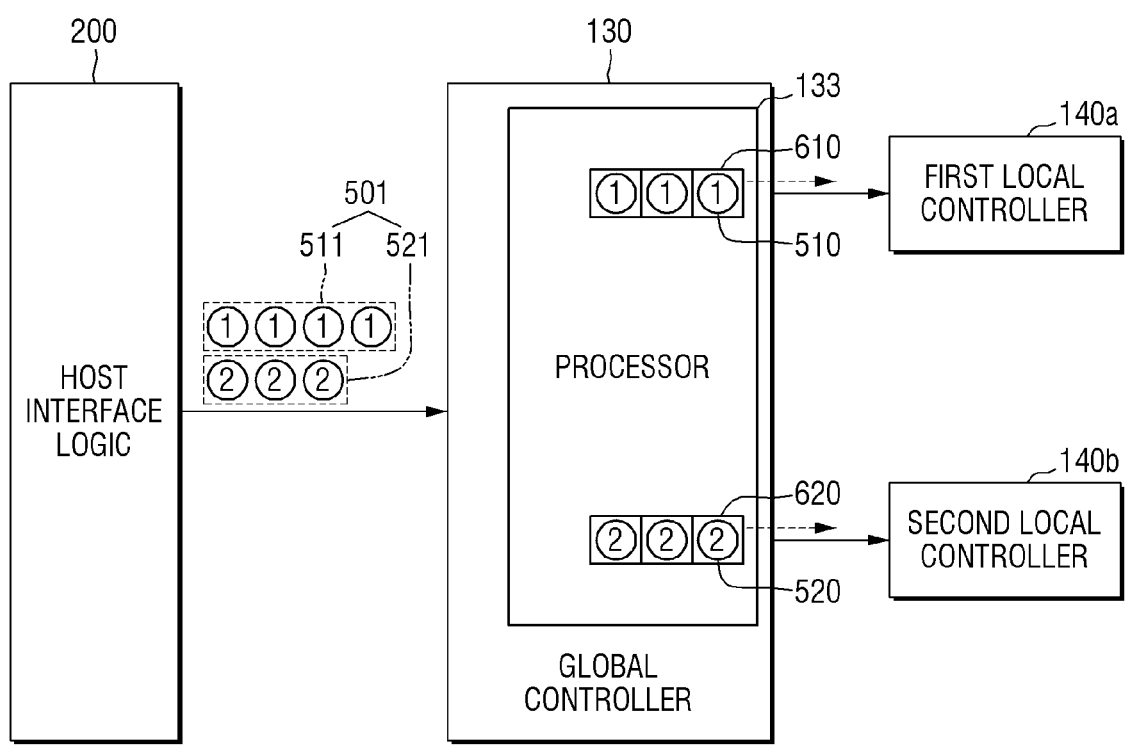

For example, referring to FIG. 6, during the first cycle, the processor 133 included in the global controller 130 may send a command 510 and a power token 610 to the first local controller 140a and a command 520 and a power token 620 to the second local controller 140b. The number of commands 510 transmitted to the first local controller 140a may be equal to the number of the power tokens 610 distributed to the first local controller 140a in FIG. 5B. Likewise, the number of commands 520 transmitted to the second local controller 140b may be equal to the number of the power tokens 610 distributed to the second local controller 140b in FIG. 5B.

For example, if three power tokens 610 have been distributed to the first local controller 140a, the processor 133 may transmit three commands 510 to the first local controller 140a. In addition, if three power tokens 620 have been distributed to the second local controller 140b, the processor 133 may transmit three commands 520 to the second local controller 140b. In this case, the processor 133 may transmit the power tokens 610 and 620 along with the commands 510 and 520 to the first local controller 140a and the second local controller 140b, respectively, during the first cycle.

Referring again to FIG. 4, the first local controller 140a may transmit to the global controller 130 first information on the type and number of commands 510 associated with the operations performed on the first group of flash memories 410 connected to the first local controller 140a during the first cycle (step S102). In addition, the second local controller 140b may transmit to the global controller 130 second information on the type and number of commands 520 associated with the operations performed on the second group of flash memories 420 connected to the second local controller 140b during the first cycle (step S103).

Figure 7:
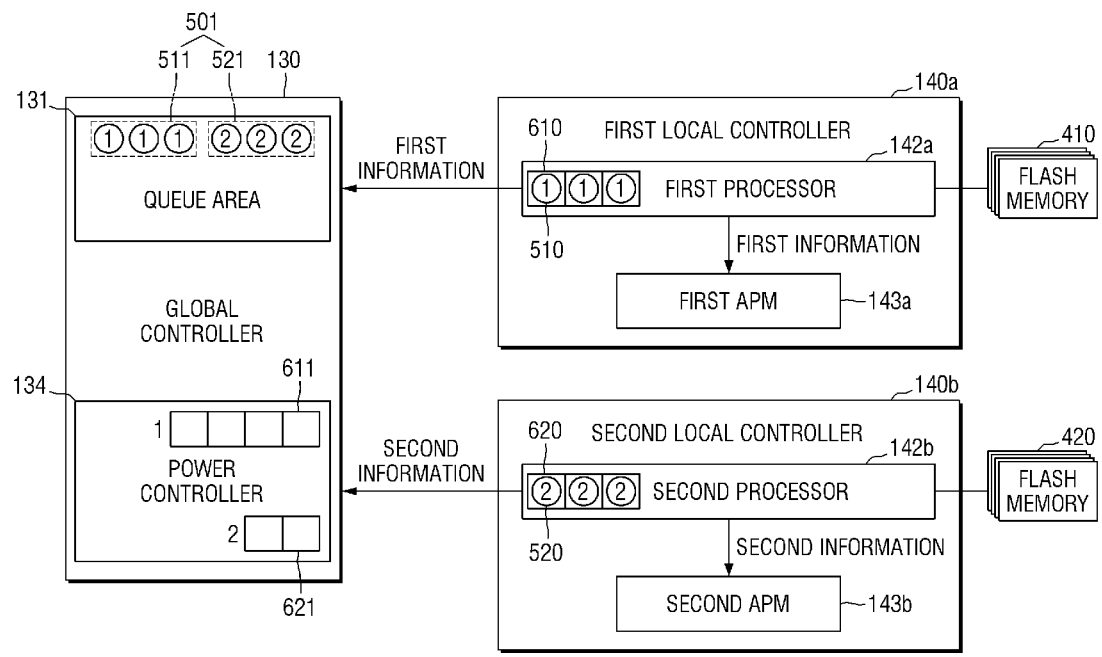

For example, referring to FIG. 7, the first processor 142a included in the first local controller 140a may transmit to the global controller 130 first information on the types and number of commands 510 associated with the operations performed on the first group of flash memories 410 connected to the first local controller 140a using the commands 510 received during the first cycle. In this case, the first processor 142a may also transmit the first information to the first APM 143a.

In addition, the second processor 142b included in the second local controller 140b may transmit to the global controller 130 second information on the types and number of commands 520 associated with the operations performed on the second group of flash memories 420 connected to the second local controller 140b using the commands 520 received during the first cycle. In this case, the second processor 142b may also transmit the second information to the second APM 143b.

Referring again to FIG. 4, the first local controller 140a may calculate the first power consumed by the first local controller 140a during the first cycle (step S104). The second local controller 140b may calculate the second power consumed by the second local controller 140b during the first cycle (step S105).

For example, referring again to FIG. 7, the first APM 143a included in the first local controller 140a may calculate the first power based on the first information received from the first processor 142a, which is the power consumption by the first local controller 140a to perform the operations on the first group of flash memories 410 during the first cycle. The second APM 143b included in the second local controller 140b may calculate the second power based on the second information received from the second processor 142b, which is the power consumption by the second local controller 140b to perform the operations on the second group of flash memories 420 during the first cycle. The first power and the second power may be calculated by Equation 1 above.

Referring back to FIG. 4, the first local controller 140a may check the first power calculated in step S104 and the number of power tokens 610 received in step S101 and may adjust the command processing speed of the first local controller 140a during the first cycle based on the calculated first power and the number of tokens 610 (step S106). In addition, the second local controller 140b may check the second power calculated in step S105 and the number of power tokens 620 received in step S101 and may adjust the command processing speed of the second local controller 140b during the first cycle based on the calculated second power and the number of tokens 620 (step S107).

Referring again to FIG. 7, the first APM 143a included in the first local controller 140a may recognize the number of power tokens 610 received together with the commands 510 during the first cycle. For example, the first APM 143a may recognize that three power tokens 610 are received together with the commands 510 during the first cycle. The first APM 143a may store therein in advance a mapping table that indicates powers each corresponding to a respective number of received power tokens. The first APM 143a may recognize a first power corresponding to the number of the received tokens 610 using the mapping table.

If the power consumption calculated in step S104 of FIG. 4 exceeds the first power, the first APM 143a may delay the commands 510 received at the first local controller 140a during the first cycle, may change the clock provided to the first local controller 140a, or may limit the number of banks of the first group of flash memories 410 on which the first local controller 140a performs an operation during the first cycle, thereby decreasing the command processing speed of the first local controller 140a.

On the other hand, if the power consumption calculated in step S104 of FIG. 4 is less than the first power, the first APM 143a may not delay the commands 510 received at the first local controller 140a during the first cycle, may change the clock provided to the first local controller 140a, or may not limit the number of banks of the first group of flash memories 410 on which the first local controller 140a performs an operation during the first cycle, thereby increasing the command processing speed of the first local controller 140a.

The second local controller 140b may adjust the command processing speed of the second local controller 140b in step S107 of FIG. 4 in the same manner as the first local controller 140a adjusts the command processing speed of the first local controller 140a in step S106 of FIG. 4, and thus a detailed description thereof will be omitted.

The first APM 143a and the second APM 143b (see FIG. 7) predict the power consumption in real-time, increase the command processing speed if the predicted power is smaller than the power allocated to each of the first local controller 140a and the second local controller 140b, and decrease the command processing speed if the predicted power is greater than the power allocated to each of the first local controller 140a and the second local controller 140b, such that the local controllers 140a, 140b themselves can automatically adjust their performances.

The global controller 130 may receive from the host interface logic 200 a plurality of commands associated with the second cycle, which is the next cycle to the first cycle, during the first cycle in step S108. In addition, the global controller 130 may queue the plurality of commands associated with the second cycle received in step S108. The global controller 130 may perform step S108 after steps S102 to S107, but this is not limiting. For example, the global controller 130 may perform step S108 simultaneously with steps S102 to S108 or before steps S102 to S107. Step S108 will be described in more detail below.

Referring again to FIG. 6, the global controller 130 may receive from the host interface logic, during the first cycle, the plurality of commands 501 associated with the second cycle. The plurality of commands 501 may include commands 511 associated with the operation to be performed at the first local controller 140*a* during the second cycle, and commands 521 associated with the operation to be performed at the second local controller 140*b* during the second cycle.

Referring again to FIG. 7, the queue area 131 included in the global controller 130, during the first cycle, may queue the commands 511 associated with an operation to be performed at the first local controller 140*a* during the second cycle and the commands 521 associated with an operation to be performed at the second local controller 140*b* during the second cycle.

Referring again to FIG. 4, the global controller 130 may recognize third information on the commands 501 queued in the queue area 131 during the first cycle, and may distribute power tokens to the first local controller 140*a* and the second local controller 140*b* based on the first information, the second information and the third information (step S109). The third information may include information on the number of commands 501 queued in the queue area 131 during the first cycle, information on the types of commands 501 queued in the queue area 131 during the first cycle, and information on the local controllers 140*a*, 140*b* to process, during the second cycle, each of the commands 501 queued in the queue area 131 during the first cycle.

When the global controller 130 recognizes that the power consumed by the first local controller 140*a* is equal to that of the second local controller 140*b* during the first cycle based on the first information and the second information, it may distribute the power tokens based on third information.

Referring again to FIG. 7, the power controller 134 may recognize that four read commands among the commands 501 queued in the queue area 131 during the first cycle are to be processed at the first local controller 140*a* during the second cycle based on the third information. In addition, the power controller 134 may recognize that two read commands among the commands 501 queued in the queue area 131 during the first cycle are to be processed at the second local controller 140*b* during the second cycle based on the third information.

The power controller 134 included in the global controller 130 may recognize that the operation is being performed at the first local controller 140*a* during the first cycle through the three read commands based on the first information. In addition, the power controller 134 may recognize that the operation is being performed at the second local controller 140*b* during the first cycle through the three read commands based on the second information. The power controller 134 may calculate power consumed during the first cycle at each of the first local controller 140*a* and the second local controller 140*b* based on the first information and the second information.

When the power controller 134 recognizes that the power consumed by the first local controller 140*a* is equal to that of the second local controller 140*b*, the power controller 134 may distribute four power tokens 611, which is equal to the number of commands 511 to be processed at the first local controller 140*a* during the second cycle, to the first local controller 140*a*, and two power tokens 621, which is equal to the number of commands 521 to be processed at the second local controller 140*b* during the second cycle, to the second local controller 140*b*.

Referring to FIG. 4, the global controller 130 may transmit one or more commands 511, 521 and power tokens 611, 621 associated with the second cycle to the first local controller 140*a* and to the second local controller 140*b* during the second cycle (S110).

Figure 8:
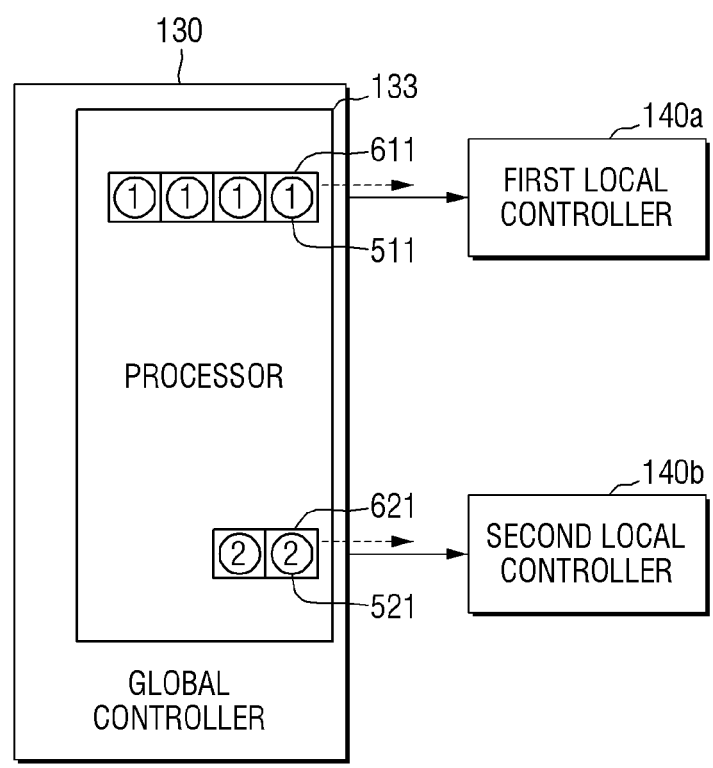

For example, referring to FIG. 8, during the second cycle, the processor 133 included in the global controller 130 may transmit the commands 511 and the power tokens 611 associated with the second cycle to the first local controller 140*a* and the commands 521 and the power tokens 621 associated with the second cycle to the second local controller 140*b*. The number of commands 511 transmitted to the first local controller 140*a* may be equal to the number of the power tokens 611 distributed to the first local controller 140*a*. Likewise, the number of commands 521 transmitted to the second local controller 140*b* may be equal to the number of the power tokens 621 distributed to the second local controller 140*b*.

For example, if four power tokens 611 have been distributed to the first local controller 140*a*, the processor 133 may transmit four commands 511 to the first local controller 140*a*. In addition, if two power tokens 621 have been distributed to the second local controller 140*b*, the processor 133 may transmit two commands 521 to the second local controller 140*b*. In this case, the processor 133 may transmit the power tokens 611 and 621 along with the commands 511 and 521 associated with the second cycle to the first local controller 140*a* and the second local controller 140*b*, respectively, during the second cycle.

Figure 9:
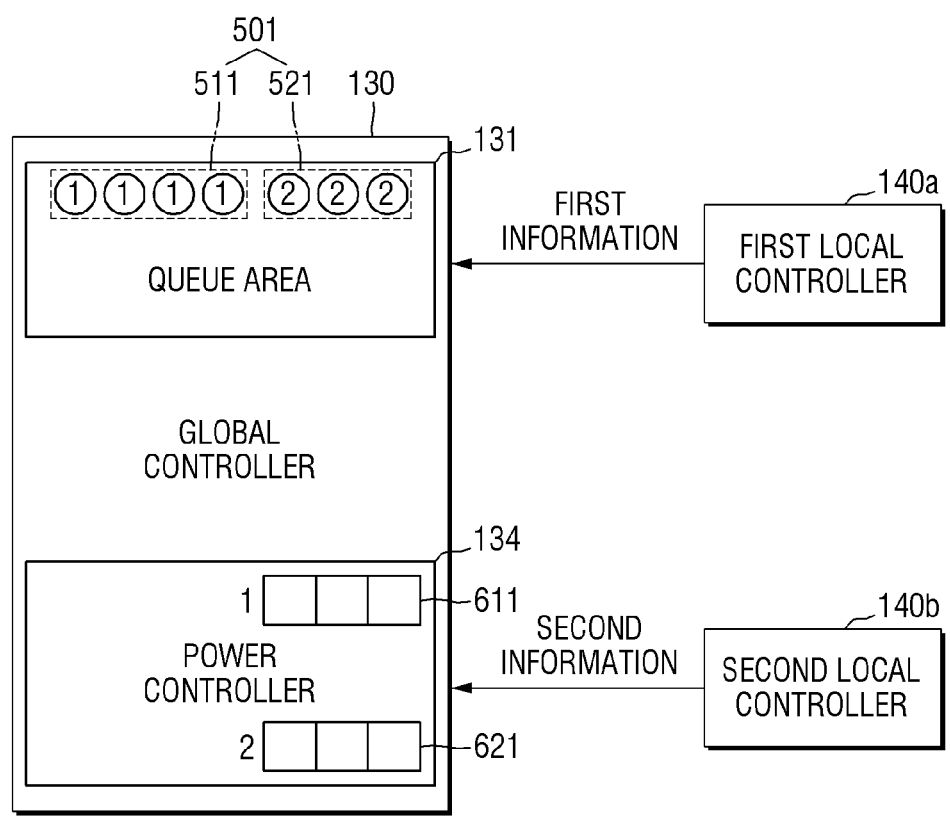
FIGS. 9 and 10 illustrate an example of a method for distributing power tokens when there are more commands queued in the queue area during the current cycle than power tokens included in the power controller of the global controller in the storage device according to some exemplary embodiments of the present disclosure.
Figure 10:
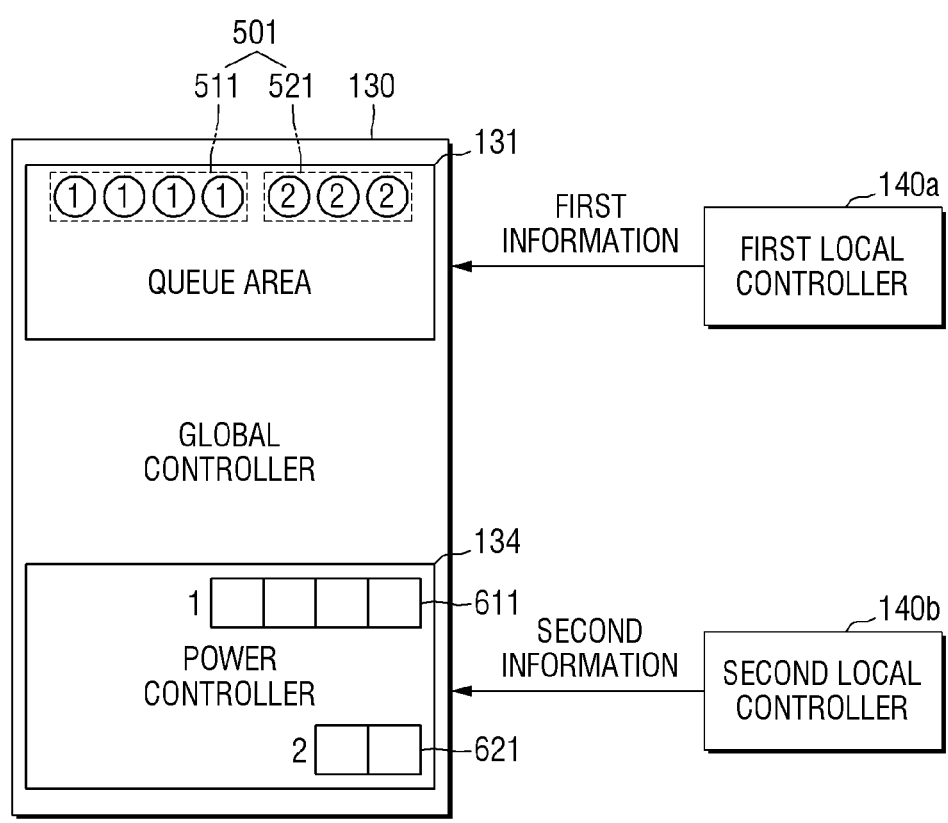

FIGS. 9 and 10 illustrate examples of a method for distributing power tokens when the commands queued in the queue area 131 during the current cycle outnumber the power tokens possessed by the power controller of the global controller included in the storage device, according to some exemplary embodiments of the present disclosure. For brevity, descriptions will be made focusing on differences from the above exemplary embodiments described with reference to FIGS. 1 to 8; and the redundant description will be omitted.

Referring to FIGS. 9 and 10, the queue area 131 included in the global controller 130 may include commands 501 associated with the second cycle that are received or evaluated by the global controller 130 during the first cycle. The commands 501 may include four first commands 511 to be processed at the first local controller 140*a* during the second cycle and three second commands 521 to be processed at the second local controller 140*b* during the second cycle. In the following description, it is assumed that the first commands 511 and the second commands 521 are of the same kind.

The global controller 130 may receive the first information from the first local controller 140*a* and the second information from the second local controller 140*b*. In addition, the power controller 134 may recognize the third information on the commands 501 queued in the queue area 131. The first information, the second information and the third information have been described above with reference to FIGS. 1 to 8, and thus will not be described in detail.

When the power controller 134 recognizes that seven commands 501, which outnumber the six power tokens 600 possessed by the power controller 134, are queued in the queue area 131 during the first cycle based on the third information, it may calculate the first power consumed at the first local controller 140*a* and the second power consumed at the second local controller 140*b* during the first cycle based on the first and second information. Then, the power controller 134 may distribute more power tokens 600 to the one of the local controllers that is consuming more power during the first cycle.

An algorithm for distributing the power tokens 600 may be stored in the power controller 134 in advance.

For example, referring to FIG. 9, when the power controller 134 recognizes that the magnitude of the second power is greater than the magnitude of the first power based on the first information and the second information, it may distribute three power tokens 611 to the first local controller 140a and three power tokens 621 to the second local controller 140b. In this example, the global controller 130 may transmit three commands 511 and three power tokens 611 to the first local controller 140a and three commands 521 and three power tokens 621 to the second local controller 140b during the second cycle, and may queue one of the commands 511 associated with the operation to be performed at the first local controller 140a during the second cycle in the queue area 131 during the second cycle.

For another example, referring to FIG. 10, when the power controller 134 recognizes that the magnitude of the first power is greater than the magnitude of the second power based on the first information and the second information, it may distribute four power tokens 611 to the first local controller 140a and two power tokens 621 to the second local controller 140b. In this example, the global controller 130 may transmit four commands 511 and four power tokens 611 to the first local controller 140a and two commands 521 and two power tokens 621 to the second local controller 140b during the second cycle, and may queue one of the commands 521 associated with the operation to be performed at the second local controller 140b during the second cycle in the queue area 131 during the second cycle.

Figure 11:
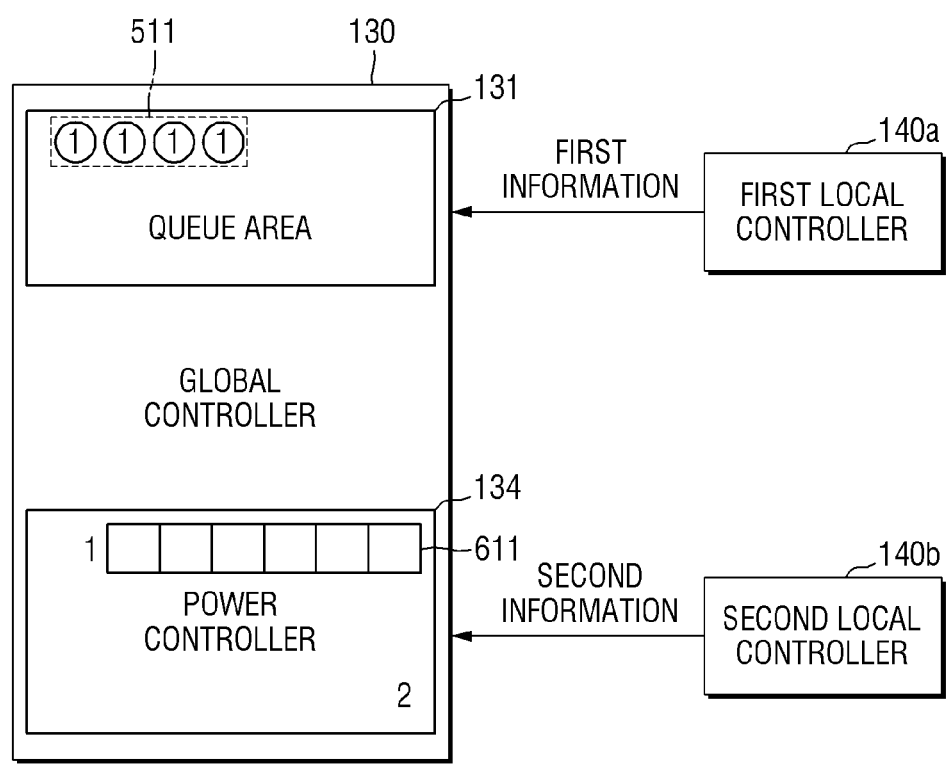
FIGS. 11 and 12 illustrate examples of a method for distributing power tokens when it is recognized that there is no command that is to be processed by the second local controller during the next cycle in the queue area of the global controller included in the storage device according to some exemplary embodiments of the present disclosure.
Figure 12:
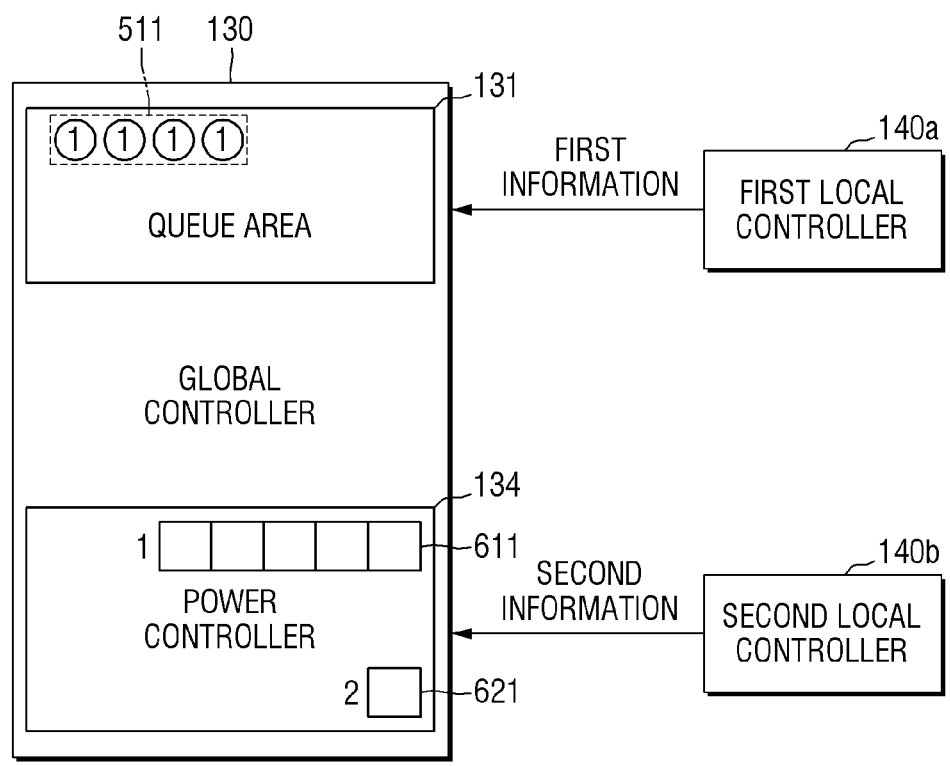

FIGS. 11 and 12 illustrate examples of a method for distributing power tokens 600 when it is recognized that there is no command 521 that is to be processed by the second local controller 140b during the next cycle in the queue area 131 of the global controller 130 included in the storage device 1 according to some exemplary embodiments of the present disclosure. For brevity, descriptions will be made focusing on differences from the above exemplary embodiments described above with reference to FIGS. 1 to 10; and the redundant description will be omitted.

Referring to FIGS. 11 and 12, the queue area 131 included in the global controller 130 may include, during the first cycle, commands 501 associated with the second cycle. In the commands 501, there may be four first commands 511 to be processed at the first local controller 140a during the second cycle, and there may be no second command 521 to be processed at the second local controller 140b during the second cycle.

The global controller 130 may receive the first information from the first local controller 140a and the second information from the second local controller 140b. In addition, the power controller 134 may recognize the third information on the commands 501 queued in the queue area 131. The first information, the second information and the third information have been described above with reference to FIGS. 1 to 8, and thus will not be described in detail.

When the power controller 134 recognizes that there is no command 521 to be processed by the second local controller 140b during the second cycle among the commands 501 queued in the queue area 131 during the first cycle based on the third information, it may distribute the power tokens 621 to the second local controller in consideration of the second information.

For example, referring to FIG. 11, if the power controller 134 recognizes that there is no operation performed at the second local controller 140b during the first cycle based on the second information, it may distribute no power token 621 to the second local controller 140b. The power controller 134 may then distribute all of the power tokens 611 to the first local controller 140a. During the second cycle, when the global controller 130 sends the commands 511 associated with the second cycle to the first local controller 140a, it may send power tokens 611 to the first local controller 140a, which outnumber the commands 511. Then, the first local controller 140a recognizes that the number of power tokens 611 is greater than the number of received commands 511, and the first local controller 140a may consume as much power as possible within the power specification limit of the storage device 1 to quickly process the operation associated with the second cycle.

For another example, referring to FIG. 12, if it is recognized that there is an operation performed at the second local controller 140b during the first cycle based on the second information, the power controller 134 may distribute one or more power tokens 621 to the second local controller 140b. In this example, the global controller 130 may transmit power tokens 621 to the second local controller 140b during the second cycle without commands 521. This is because the second local controller 140b has to process internal IO, such as garbage collection and wear leveling during the second cycle when it has received the power tokens 621 only.

According to some exemplary embodiments of the present disclosure, when the power controller 134 recognizes that there is no command 511 to be processed by the first local controller 140a during the second cycle among the commands 501 queued in the queue area 131 during the first cycle based on the third information, it may distribute the power tokens 611 to the first local controller in consideration of the first information. This has been described above with reference to FIGS. 11 and 12; and, therefore, the redundant description will be omitted.

Figure 13:
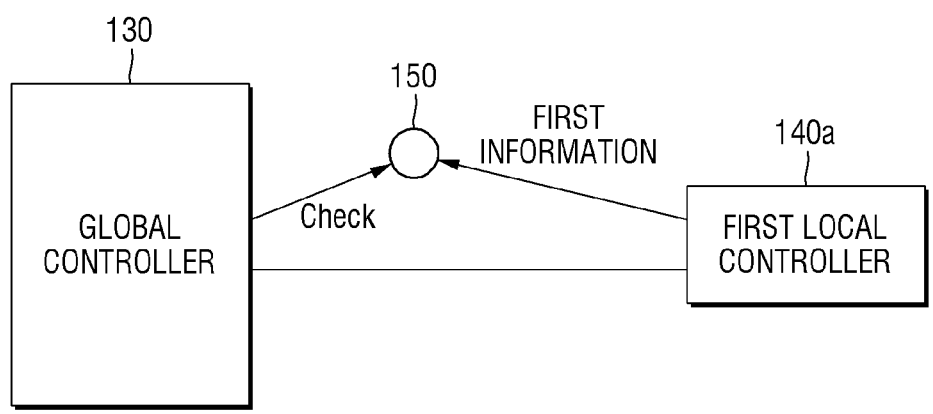
FIG. 13 is a diagram for illustrating an example of a method of transmitting information from a local controller to a global controller in a storage device according to some exemplary embodiments of the present disclosure.

FIG. 13 is a diagram for illustrating an example of a method of transmitting information from a local controller to a global controller in a storage device according to some exemplary embodiments of the present disclosure. Although FIG. 13 depicts only the first local controller 140a, the embodiment described in FIG. 13 can be equally applied to the second local controller 140b.

Referring to FIG. 13, an SSD controller 100 may include a hardware pin 150. The hardware pin 150 may include a general purpose input/output (GPIO).

The first local controller 140a may transmit to the hardware pin 150 information on the type and number of commands associated with the operations performed on the plurality of flash memories connected to the first local controller 140a during the current cycle. The hardware pin 150 may receive and store the information.

The global controller 130 may check the hardware pin 150 at a predetermined time interval (e.g., 100 ms). If the hardware pin 150 has the information, the global controller 130 may receive the information stored in the hardware pin 150.

According to the above-described embodiment, it is possible to solve the problem that the global controller 130 cannot transmit a command to a local controller 140a while the local controller 140a transmits information to the global controller 130, which happens when the global controller 130 transmits a command to the local controller 140a and the local controller 140a transmits information to the global controller 130 via the same line.

According to some exemplary embodiments of the present disclosure, the global controller 130 may receive information on the type and the number of commands associated with the operations performed on the plurality of flash memories 410 connected to the first local controller 140a from the first local controller 140a via a line different from the line on which a command is transmitted to the local controller 140a.

Figure 14:
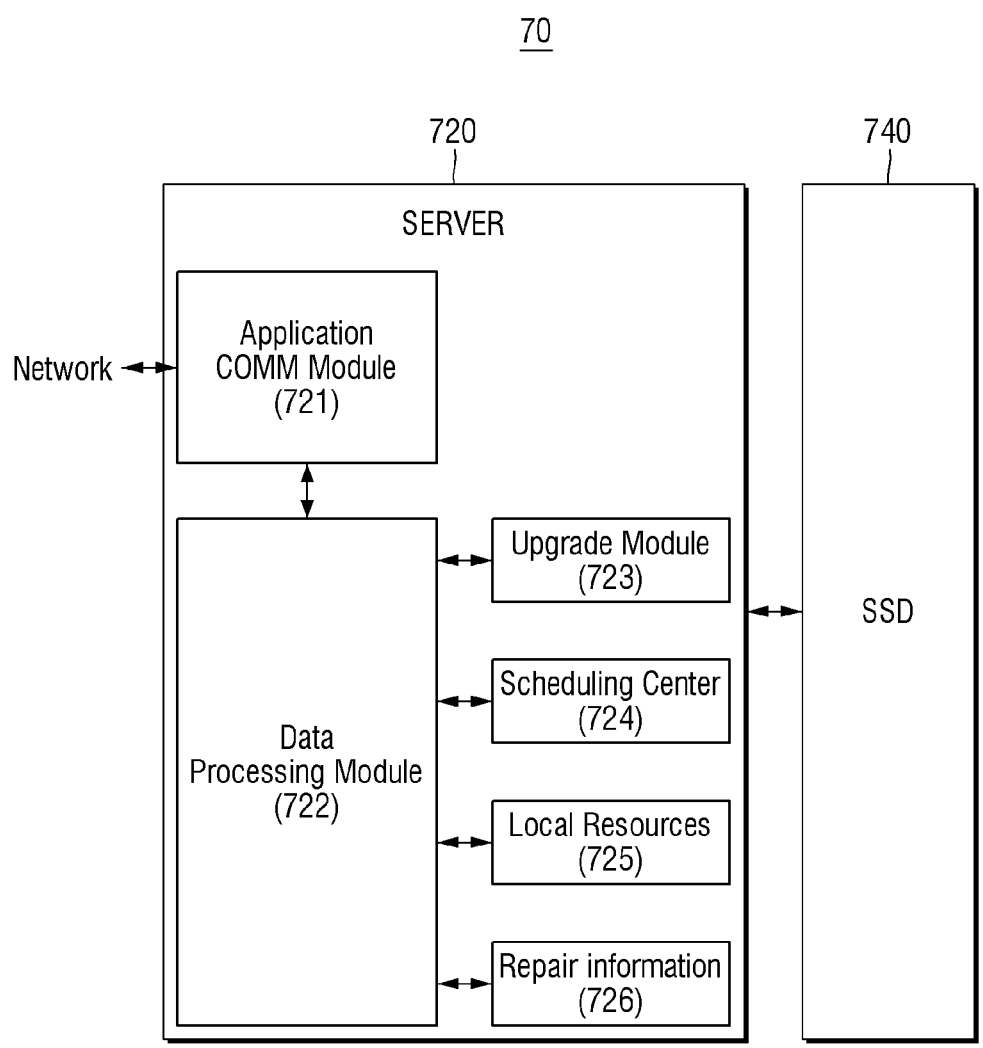
FIG. 14 is a block diagram for illustrating a server system using the SSD of FIG. 1.

FIG. 14 is a block diagram for illustrating a server system using the SSD of FIG. 1.

Referring to FIG. 14, a server system 70 may include a server 720 and an SSD 740 that stores data necessary for driving the server 720. The SSD 740 includes the same configuration as the storage device 1 shown in FIG. 1.

The server 720 may include an application communications module 721, a data processing module 722, an upgrade module 723, a scheduling center 724, a local resource module 725 and a repair information module 726.

The application communications module 721 may be used to enable the server 720 to communicate with a computing system connected to a network, Network, or with the SSD 740. The application communications module 721 transmits data or information provided via a user interface to the data processing module 722.

Data processing module 722 may be linked to the local resource module 725. The local resource module 725 provides the user with a list of repair shops/dealers/technical information based on the data or information input to the server 720.

The upgrade module 723 interfaces with the data processing module 722. The upgrade module 723 upgrades the electronic appliance with firmware, a reset code, a diagnostic system upgrade or other information based on the data or information transmitted from the SSD 740.

The scheduling center 724 allows the user to use options in real-time based on the data or information input to the server 720.

The repair information module 726 interfaces with the data processing module 722. The repair information module 726 may be used to provide repair-related information (e.g., audio, video, or document files) to the user. Data processing module 722 packages the related information based on the information delivered from SSD 740. Then, such information may be transmitted to the SSD 740 or displayed to the user.

An apparatus for fabricating a storage device according to some exemplary embodiments of the present disclosure provides a wafer or package including a plurality of physically separated controllers and a plurality of flash memories, and tests the wafer or package. The provided wafer or package includes: a first local controller connected to a first group of flash memories among the plurality of flash memories; a second local controller connected to a second group of flash memories different from the first group of flash memories among the plurality of flash memories, and a global controller connected to the first local controller and the second local controller. The global controller transmits commands and power tokens to the first local controller and/or the second local controller during the current cycle. The first local controller transmits to the global controller first information on the type and number of commands associated with operations performed on the first group of flash memories during the current cycle, calculates a power consumption by the first local controller during the current cycle based on the first information, and adjusts the command processing speed of the first local controller based on the second information on the calculated power consumption and the number of power tokens received by the first local controller. The second local controller transmits to the global controller third information on the type and number of commands associated with operations performed on the second group of flash memories during the current cycle, calculates a power consumption by the second local controller during the current cycle based on the third information, and adjusts the command processing speed of the second local controller based on the fourth information on the calculated power consumption and the number of power tokens received by the second local controller.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Although the exemplary embodiments of the present disclosure have been described with reference to the accompanying drawings, those skilled in the art would understand that various modifications and alterations may be made without departing from the technical idea or essential features of the present disclosure. Therefore, it should be understood that the above-mentioned embodiments are not limiting but illustrative in all aspects.

What is claimed is:
1. A storage device comprising:
a plurality of flash memories;
a first local controller connected to a first group of flash memories among the plurality of flash memories;
a second local controller connected to a second group of flash memories among the plurality of flash memories, wherein the second group of flash memories are different from the first group of flash memories; and
a global controller configured to transmit commands to at least one of the first local controller and the second local controller, wherein:
the first local controller comprises a first processor configured to transmit first information specifying a type and number of commands associated with an operation performed on the first group of flash memories to the global controller,
the second local controller comprises a second processor configured to transmit second information specifying a type and number of commands associated with an operation performed on the second group of flash memories to the global controller, and
the first local controller further comprises a first adaptive power management (APM) configured to:
calculate a power consumption of the operation performed on the first group of flash memories based on the first information, and adjust a command processing speed of the first local controller based on the power consumption and a number of power tokens received from the global controller.

2. The storage device of claim 1, wherein:
the global controller further comprises:
a queue area where one or more commands associated with a second cycle is queued during a first cycle, wherein the second cycle is the next cycle to the first cycle; and
a command analyzer configured to check third information on the one or more commands queued in the queue area during the first cycle, and
the third information is information different from the first information and from the second information.

3. The storage device of claim 2, wherein the third information comprises information indicating a number of the one or more commands queued in the queue area during the first cycle, information indicating a type of the one or more commands queued in the queue area during the first cycle, and information indicating a local controller to process during the second cycle each of the one or more commands queued in the queue area during the first cycle.

4. The storage device of claim 2, wherein:
the global controller further comprises a power controller and a third processor,
the power controller is configured to:
have a predetermined number of power tokens, and
distribute the predetermined number of power tokens to each of the first local controller and the second local controller based on the first information,
the second information and the third information,
the third processor is configured to:
transmit first commands among the one or more commands queued in the queue area during the first cycle to the first local controller during the second cycle, and
transmit second commands among the one or more commands queued in the queue area during the first cycle to the second local controller during the second cycle,
the first commands are to be processed at the first local controller during the second cycle, and
the second commands are to be processed at the second local controller during the second cycle.

5. The storage device of claim 4, wherein:
a number of the first commands transmitted to the first local controller during the second cycle corresponds to a number of power tokens distributed to the first local controller during the first cycle, and
a number of the second commands transmitted to the second local controller during the second cycle corresponds to a number of power tokens distributed to the second local controller during the first cycle.

6. The storage device of claim 4, wherein in response to the power controller recognizing that there is no command to be processed by the second local controller during the second cycle among the commands queued in the queue area during the first cycle, the power controller is further configured to determine a number of power tokens to be distributed to the second local controller based on the second information.

7. The storage device of claim 6, wherein the power controller is further configured to:
in response to recognizing that there is a third operation performed at the second local controller during the first cycle based on the second information,
distribute one or more power tokens to the second local controller, and
in response to recognizing that there is no third operation performed at the second local controller during the first cycle based on the second information, distribute no power token to the second local controller.

8. The storage device of claim 4, wherein:
the first APM is configured to receive fourth information indicating a type and number of the first commands associated with a first operation performed on the first group of flash memories during the second cycle from the first processor and calculate a power consumption of the first operation based on the fourth information, and
the second local controller further comprises a second APM configured to receive fifth information indicating a type and number of the second commands associated with a second operation performed on the second group of flash memories during the second cycle from the second processor and calculate a power consumption of the second operation based on the fifth information.

9. The storage device of claim 8, wherein:
the first APM is further configured to adjust the command processing speed of the first local controller based on the power consumption of the first operation and the number of power tokens distributed to the first local controller, and
the second APM is further configured to adjust a command processing speed of the second local controller based on the power consumption of the second operation and a number of power tokens distributed to the second local controller.

10. The storage device of claim 1, wherein the type of commands associated with the operation performed on the first group of flash memories is read commands.

11. A local controller disposed in a storage device and connected to a global controller, the local controller comprising:
a command receiver configured to receive one or more commands from the global controller;
a processor configured to perform an operation corresponding to the one or more commands on a plurality of flash memories connected to the local controller; and
an adaptive power management (APM) configured to receive information specifying a number and type of commands associated with the operation performed on the plurality of flash memories from the processor and calculate a power consumption of the operation performed on the plurality of flash memories based on the information, wherein:
the processor is further configured to transmit the information specifying the number and type of commands associated with the operation performed on the plurality of flash memories to the global controller,
the command receiver is further configured to receive power tokens from the global controller, and
the APM is further configured to adjust a command processing speed of the local controller based on the power consumption and a number of the power tokens.

12. The local controller of claim 11, wherein the APM is further configured to:
recognize a first power corresponding to the number of power tokens,
apply a delay to the one or more commands to decrease the command processing speed of the local controller in response to determining the power consumption exceeds the first power, and increase the command processing speed of the local controller without the delay in response to determining the power consumption is lower than the first power.

13. The local controller of claim 11, wherein the APM is further configured to:
recognize a first power corresponding to the number of power tokens,
change a clock provided to the local controller to decrease the command processing speed of the local controller in response to determining the power consumption exceeds the first power, and
change the clock provided to the local controller to increase the command processing speed of the local controller in response to determining the power consumption is lower than the first power.

14. The local controller of claim 11, wherein the APM is further configured to:
recognize a first power corresponding to the number of power tokens,
limit a number of banks of the plurality of flash memories on which the local controller performs an operation to decrease the command processing speed of the local controller in response to determining the power consumption exceeds the first power, and
increase the command processing speed of the local controller without limitation the number of banks of the plurality of flash memories in response to determining the power consumption is lower than the first power.

15. The local controller of claim 11, wherein the type of commands associated with the operation performed on the plurality of flash memories is read commands.

16. A global controller disposed in a storage device and connected to a first local controller and a second local controller physically separated from each other, the global controller comprising:
a queue area where one or more commands associated with a next cycle are queued during a current cycle;
a power controller having a predetermined number of power tokens and configured to distribute the predetermined number of power tokens to each of the first local controller and the second local controller; and
a command analyzer configured to check first information on the one or more commands queued in the queue area during the current cycle, wherein:
the power controller is further configured to:
receive second information specifying a type and number of commands associated with an operation performed on a first group of flash memories connected to the first local controller during the current cycle from the first local controller, and
receive third information specifying a type and number of commands associated with an operation performed on a second group of flash memories connected to the second local controller during the current cycle wherein the second group of flash memories are different from the first group of flash memories from the second local controller,
the third information is different from the first information and from the second information, and
the first information comprises information indicating a number of the one or more commands queued in the queue area during the current cycle, information indicating a type of the one or more commands queued in the queue area during the current cycle, and information indicating the first local controller and the second local controller to process each of the one or more commands during the next cycle.

17. The global controller of claim 16, further comprising:
a processor configured to transmit first commands among the one or more commands queued in the queue area during the current cycle to the first local controller during the next cycle, and transmit second commands among the one or more commands queued in the queue area during the current cycle to the second local controller during the next cycle, wherein:
the first commands are to be processed at the first local controller during the next cycle, and
the second commands are to be processed at the second local controller during the next cycle.

18. The global controller of claim 17, wherein:
the power controller is further configured to distribute the predetermined number of power tokens to each of the first local controller and the second local controller based on the first information, the second information and the third information,
a number of the first commands transmitted to the first local controller during the next cycle corresponds to a number of power tokens distributed to the first local controller during the current cycle, and
a number of the second commands transmitted to the second local controller corresponds to a number of power tokens distributed to the second local controller during the current cycle.

19. The global controller of claim 17, wherein in response to the power controller recognizing that there is no command to be processed by the second local controller during the next cycle among the commands queued in the queue area during the current cycle, the power controller is further configured to determine a number of power tokens to be distributed to the second local controller based on the second information.

20. The global controller of claim 19, wherein the power controller is further configured to:
in response to recognizing that there is a third operation performed at the second local controller during the current cycle based on the second information, distribute one or more power tokens to the second local controller, and
in response to recognizing that there is no third operation performed at the second local controller during the current cycle based on the second information, distribute no power token to the second local controller.

* * * * *